Oct. 7, 1952   J. A. SIMPSON ET AL   2,612,706
CONTINUOUS MANUFACTURE OF EXTRUDED
CLAY COMPOSITION BODIES
Filed Dec. 13, 1949   2 SHEETS—SHEET 1
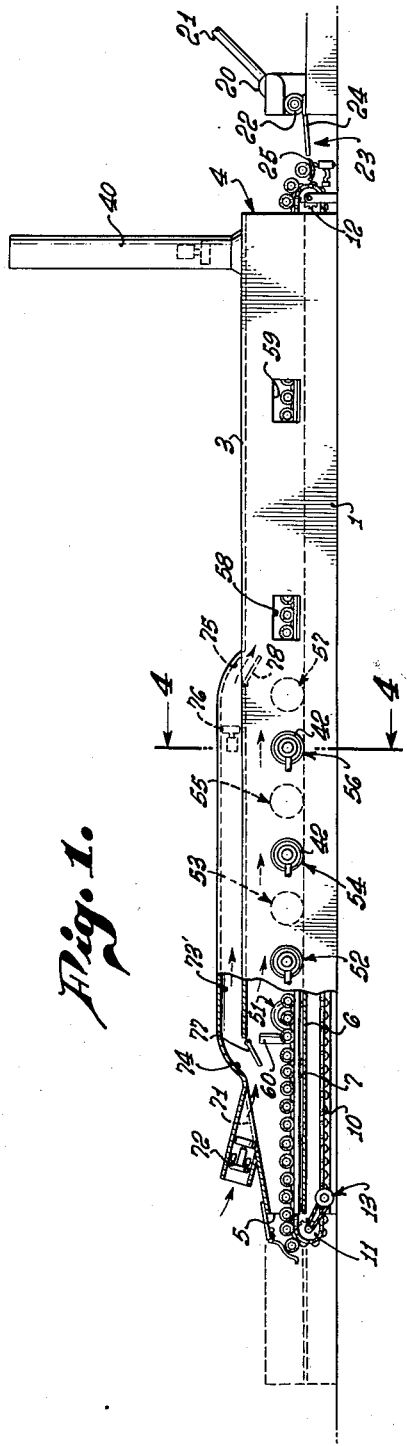
INVENTORS.
JOSEPH A. SIMPSON,
CLARK SUTHERLAND
BY
ATTORNEY.

Oct. 7, 1952   J. A. SIMPSON ET AL   2,612,706
CONTINUOUS MANUFACTURE OF EXTRUDED
CLAY COMPOSITION BODIES
Filed Dec. 13, 1949   2 SHEETS—SHEET 2
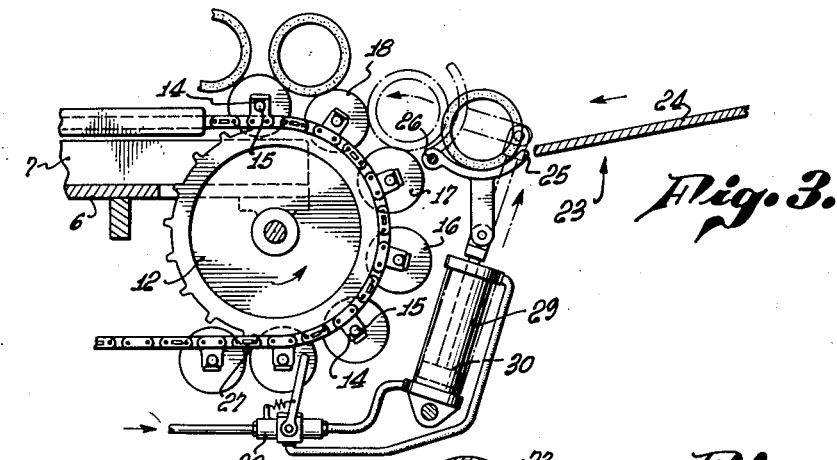
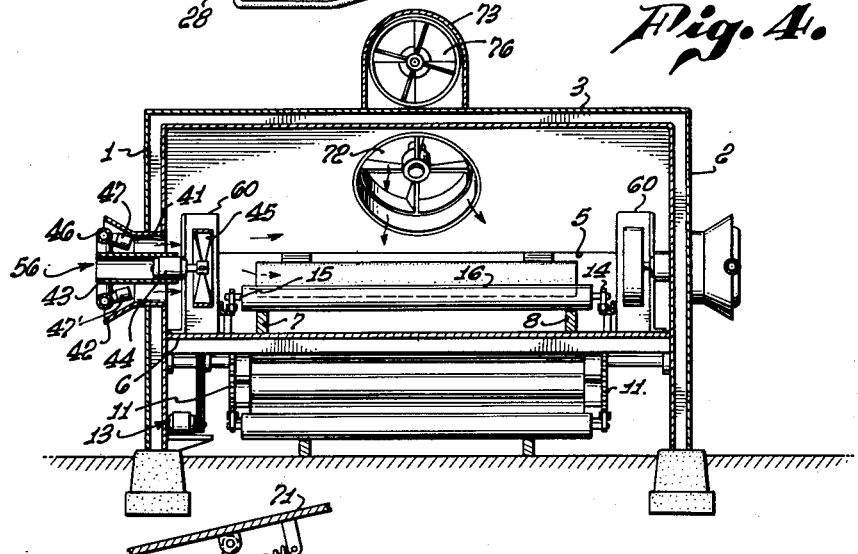
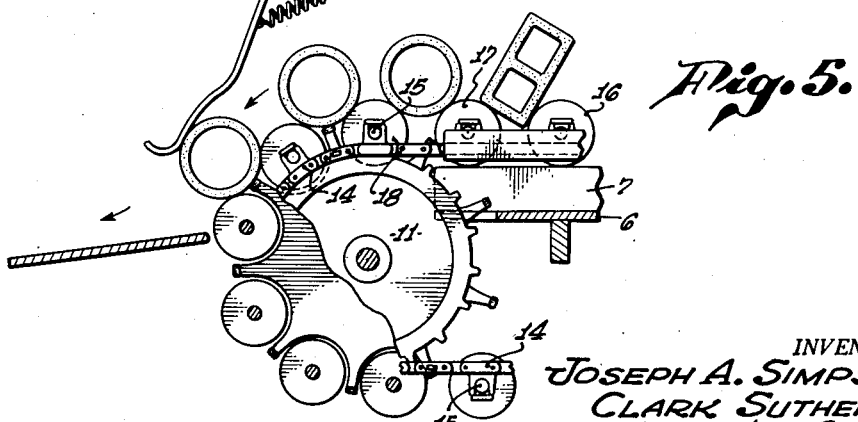
INVENTORS.
JOSEPH A. SIMPSON,
CLARK SUTHERLAND
BY
ATTORNEY.

Patented Oct. 7, 1952

2,612,706

UNITED STATES PATENT OFFICE 2,612,706

CONTINUOUS MANUFACTURE OF EXTRUDED CLAY COMPOSITION BODIES

Joseph A. Simpson, Stockton, and Clark Sutherland, Pasadena, Calif., assignors to Pacific Clay Products, Los Angeles, Calif., a corporation of California Application December 13, 1949, Serial No. 132,694

6 Claims. (Cl. 34—105)

This invention relates to the manufacture of clay pipe and conduit and is particularly directed to means and methods whereby such objects can be manufactured in a substantially continuous manner in long lengths and dried efficiently and rapidly while maintaining such objects substantially straight and free from warpage or sagging.

Pipe and conduit (the latter referring to what is known as multiple-duct conduit, which generally is of polygonal cross section) is generally made by extruding a suitably blended clay composition, cutting the extruded form into relatively short lengths (24 in.-36 in.), standing these short lengths on their ends upon pallets, conveying the pallets into a drying room, then moving the partially dried forms into a drier, and eventually subjecting the dried objects to burning in order to mature the body. In some instances, the objects are sprayed with a glaze composition before burning; in other instances they are salt-glazed during burning. During these various operations many of the extruded forms are dented or deformed. Numerous attempts have been made for many years to evolve more efficient methods of drying and handling, but none of them have proved to be practical. It has been impossible to produce long lengths of extruded pipe because longer lengths cannot be handled in the customary manner without breakage of the freshly formed, relatively weak body. Moreover, shrinkage and warpage contribute to the production of defective, irregular, eccentric objects which cannot be effectively used in final installations.

The present invention is directed toward methods and means whereby long lengths of pipe and conduit may be formed by the usual extrusion presses and such long lengths of pipe and conduit handled in an efficient and effective manner. Whereas normally, two to three weeks are required to dry a freshly extruded section of conduit (thereby reducing its water content from about 20% to 5–6%), the method and apparatus of the present invention permit conduit to be dried in four to five hours. Furthermore, the method and means of the present invention permit the pipe or conduit to be manufactured in lengths of six or eight feet without warpage or the production of defective or damaged pieces. As a result, pipe lines can be laid with a minimum number of joints, and it is well known that in sewage lines, etc., most difficulties are encountered at the joints, since these provide points of entry for roots and constitute zones where leakage occurs. It is also to be remembered that most of the labor spent in laying a pipe or conduit is concerned with the preparation and formation of the joints. It is evident, therefore, that the production of long lengths of ceramic pipe is the key to economical and efficient utilization of these materials.

The problems confronting the ceramic industry in the production of clay pipe and conduit are aggravated by the physical characteristics of the materials being handled. The freshly extruded pipe is fragile and at the same time heavy. During drying very material shrinkage takes place. The clay pipe, because of its weight, tends to sag and since the clay is plastic and exhibits what may be termed plastic deformation, the extruded objects lose their desired shape, since the object does not recover its original shape even when the tension or pressure applied thereto is released. A plastic gliding of the clay particles composing the body distinguishes clay compositions from substantially all other compositions. Uniformity in the finished product is essential in order to permit the pipe sections or conduit sections to be suitably connected in a line, and therefore it is essential that the product maintain the configuration imparted thereto by the extruded die.

The present invention contemplates a mode of operation whereby the pipe or conduit is extruded horizontally directly onto a loader provided with suitable cut-off means, whereby the continuously extruded pipe is cut into predetermined or desired length. The section of pipe is then immediately moved in a transverse direction (preferably over a suitable marking device) and placed upon and between a pair of rollers, the loading device operating in timed relation to the movement of the rollers. The rollers connect two spaced, continuous chains, the chains and rollers constituting an endless conveyor. The conveyor extends through a drier having side walls, a roof, an open feed end and a discharge end. The upper lay of such conveyor extends above a pair of tracks, such tracks extending longitudinally through the drier, the rollers resting upon the tracks in rolling contact therewith, rotation being imparted to the rollers by such frictional contact to the track as the two chains are driven through the drier.

As the lengths of pipe progress from the feed end to the discharge end of the drier, they are constantly rotated, since the pipe lengths are in contact with the rotating surfaces of the rollers. Means for supplying heated gases are supplied near the discharge end of the drier, such means supplying heated gases through ports in the side walls of the drier, a part at least of the gases so supplied being directed into the open ends of the lengths of pipe or conduit supported on the rotating rollers. An exhaust stack is in communication with the roof of the drier adjacent the feed end thereof so that in general the heated gases pass from a point near the discharge end of the drier toward the stack and feed end, counter to the movement of the pipe and conduit.

Pursuant to the preferred mode of operation, the heated gases do not travel longitudinally of the drier, but instead, are caused to zig-zag while they progress from the heating sources to the stack. As a result, the heated air is rapidly moved through the lengths of pipe from one side to the other of the drier, thereby imparting heat to the pipe in a very effective manner, preventing localized heating and insuring uniform shrinkage of the pipe during the drying operation without the production of strains or stresses which would normally result in defects, fractures, etc.

Moreover, pursuant to the present invention, means are provided for regulatably controlling the amount of total air or heated gases which are deflected in a direction generally transverse to the longitudinal axis of the drier, thereby permitting a regulated and controlled quantity of heated gases to move toward the stack. These means permit very accurate control of temperatures during various stages of drying. It is to be remembered that clay bodies do not lose their water in a uniform manner, but instead, by reason of the structure of a clay mass and the affinity of clay for water, the evaporation curve or rate at which water is lost from a body with uniformly rising temperature is an irregular function and not a linear function of the temperature. The means herein described therefore permit specified zones of the drier to more effectively utilize the heat or rapidly pass the heated gases transversely of the drier, whereas in other zones the heated gases are permitted to move toward the feed end and stack in a more rapid manner.

It is an object of the present invention, therefore, to disclose and provide improved means and methods of producing long lengths of ceramic pipe and conduit.

It is an object of the invention to disclose and provide means for effectively and rapidly drying pipe and conduit without deformation, sagging or deviation from predetermined cross-sectional form.

It is also an object of the present invention to provide means and methods whereby lengths of pipe and conduit are moved in a lateral direction while rotating and heated gases are repeatedly passed thereover and therethrough in directions substantially parallel to the axes of such pipe and conduit.

These and other objects and advantages of the invention will become apparent to those skilled in the art from the following description of an exemplary form of apparatus in which the methods herein disclosed may be carried out. In order to facilitate explanation, reference will be had to the appended drawings, in which Fig. 1 is a side elevation of one form of drier contemplated by this invention.

Fig. 2 is a plan view thereof.

Fig. 3 is an enlarged side view of the feed end and associated devices.

Fig. 4 is an enlarged transverse section taken along the plane IV—IV in Fig. 1.

Fig. 5 is a side elevation, partly in section, of the discharge end of the drier.

Generally speaking, the drier is of a continuous type adapted to continuously receive freshly extruded lengths of pipe and continuously discharge dried lengths of pipe or conduit. The drier includes side walls 1 and 2 and a roof 3; it is provided with an open feed end 4 and a discharge end 5. It may include a horizontally disposed floor 6 which supports longitudinally extending, parallel, spaced, fixed rails 7 and 8 (see Fig. 4). The roller conveyor hereinbefore mentioned extends completely through the drier; such roller conveyor may comprise the spaced continuous chains 10 and 10' with their upper lays above the floor 6 and their lower lays beneath said floor. The ends of the conveyor are supported upon sprockets 11 and 12, one of said sprockets being mounted upon a shaft driven in any suitable manner, preferably by means of a variable speed reduction gear drive generally indicated at 13. The chains 10 and 10' carry spaced yokes 14 adapted to rotatably receive the ends of shafts 15 extending from each of the rollers 16, 17, 18, etc. These rollers rest upon and frictionally contact the tracks 7 and 8, so that when the conveyor chains 10 and 10' are moved simultaneously the rollers 16–18 are caused to rotate by rolling contact with the track. The rear lay of the conveyor may extend beneath the floor 6 and the rollers may again be supported upon a trackway to prevent their injury and to relieve the load on the driving chains, as illustrated in Fig. 4.

It may be noted at this time that the rollers 16–18 are on centers spaced between about 1.2 to 2.7 times the diameter of each of said rollers. For example, rollers 4½ in. in outside diameter may be on 7.5 in. to 8 in. centers and will adequately support clay pipe 6 in., 8 in., or 12 in. in diameter. Obviously, the diameter and spacing of the rollers can be varied in accordance with the size of pipe or conduit which is being manufactured, appreciable variation in diameter of the pipe or conduit being permitted with each size and spacing of rollers. The rollers may be made of wood or metal, although metallic rollers are preferred.

The arrangement contemplated by this invention eliminates unnecessary handling of the pipe or conduit. In order to attain this objective, the blended clay from which the extrusions are to be made is supplied to a pug mill 20, or to tandem pug mills, by means of a chute or conveyor 21, the pug mills delivering the moistened clay mixture to an extrusion machine of the auger type (or plunger type) 22. A deaerating device or chamber may be interposed between the pug mill and the extrusion machine. The die through which the desired shape is continuously extruded is directed horizontally and preferably slightly above the level of the shaft upon which sprocket 12 is mounted. The extrusion machine 22 is adjacent the feed end 4 of the drier and is adapted to discharge the pipe or conduit upon the loading means 23 which includes a suitable severing or cutting-off mechanism adapted to travel with the extruded pipe while making its cut. Such cut-off mechanisms are well known in the art. The cut-off mechanism is arranged so that the severed length of pipe is directly opposite the inlet end of the drier and after being severed may be rolled over the inclined table 24 into a receiving trough 25. The inclined table 24 may be provided with a marking plate having letters or symbols raised above the level of the table so that when the pipe or conduit is rolled thereover, it becomes embossed with the manufacturer's name, trademark or identifying indicia.

The receiving trough 25 is pivotally mounted as at 26 and suitable means are provided for pivoting the entire trough about an axis parallel to the pipe and permit the pipe to roll from the trough upon a pair of rollers of the conveyor. Manually or automatically actuating means for loading the pipe onto the conveyor may be provided. A simple mechanical arrangement is illustrated in the drawings, wherein lugs 27 carried by chain 10 of the conveyor trip a double-acting valve 28 adapted to supply pressure fluid to cylinder 29 for actuating piston 30 having its end pivotally connected to the trough so as to move it into desired position. Upon reaching discharge position, the valve 28 is automatically reversed, thereby lowering the trough into position to receive another section of pipe from the loading table. It is to be understood that hydraulically operated, mechanically operated, or electrically operated means for actuating the trough in timed relation to the movement of the conveyor may be provided.

The freshly extruded pipe is therefore rolled upon two adjacent rollers and is supported thereby. As the conveyor moves through the drier, the supporting rollers 16–18 rotate the sections of pipe, and such constant rotation appears to knead the surface of the pipe, imparting added density thereto. The pipe is prevented from sagging because it is constantly rotated and as a result its symmetry is maintained throughout the drying operation.

It may be noted that the loading table may be provided with finishing devices which are preferably located adjacent the ends of the receiving trough 25. The finishing device may true the ends of the freshly cut sections of pipe, eliminating burrs, and, if desired, scoring the external surface of the pipe so as to facilitate subsequent bonding with sealing composition at the joints when the pipe is laid. The truing devices employed may involve rotating cups, discs, beveling devices, etc. One form of such end-forming devices is illustrated in Patent No. 2,451,713.

Adjacent feed end 4 of the drier and in communication therewith is a gas exhaust stack 40 which may be provided with a suitable fan or fans in order to facilitate the movement of gases through the drier from the discharge end 5 in countercurrent relation to the movement of the conveyor and up the stack. Near the discharge end of the drier a plurality of means for supplying heated gases are provided in each side wall. Although the heat may be supplied from kilns or other sources of waste heat, it has been found desirable to use individual heat sources of the character best illustrated in Fig. 4. As there shown, the side wall 1 of the drier is provided with a port 41, the center of the port being substantially at the level of the upper surfaces of the rollers 16–18 of the conveyor. A conical shield 42 leads into the port. Centrally disposed within the shield is a tubular sleeve 43 containing a motor 44 connected to a fan 45 capable of rotating within the port so as to direct a blast of gases against the ends of the pipe carried by the conveyor, such blast being directed toward the opposite wall of the drier. Surrounding the sleeve 43 is an annulus of pipe 46 suitably connected to a source of fuel, such annulus bearing a plurality of burners indicated at 47 and 47'. These short flame burners heat the gases which are directed against the pipe by the fan 45.

It may be noted at this point that the side wall construction illustrated in the drawings is exemplary only, since various forms of construction may be employed. Expensive construction need not be used inasmuch as the maximum temperatures ordinarily encountered in a drier of this type need not exceed 250° F. near the discharge end of the drier, while the temperatures near the feed end are only on the order of 115°–130° F.

These various heat-supplying means are illustrated diagrammatically in Figs. 1 and 2 at 50, 52, 54 and 56. It is to be noted that these heat-supplying means are spaced from each other and are in staggered relation with the heat-supplying means 51, 53, 55 and 57 disposed in the opposite wall of the drier. This staggered arrangement of heat sources has been found to be particularly efficacious. The number of heat sources employed may vary with the character and size of the pipe or conduit being treated, but in actual practice the heat-supplying means can well occupy from about 15% to 25% of the total length of the drier, the zone in which the heat sources are located being adjacent the discharge end 5.

In addition to the ports through which heat is supplied, the side walls may be provided with selective, removable inspection doors such as 58 and 59.

From the arrangement disclosed it will be evident that heated gases are caused to pass axially through the pipe on the roller conveyor. Since the exhaust stack 40 includes suction fan means, the heated gases are caused to move toward the feed end 4, a certain proportion of the total air thus moving through the dried being blasted in a direction virtually transverse to the drier.

It will be noted from an examination of Fig. 4 that some space exists between the side walls and the ends of the conveyor. This space permits some of the heated gases to move longitudinally of the drier toward the stack 40. Means are provided for controlling the proportion of total gases within the drier which are directed toward the opposing wall by the fan and that proportion which is permitted to move longitudinally of the drier. Such means may take the form of adjustably positionable baffles in virtually vertical planes and in cooperation with at least some of the fans for controlling the proportion of the total gases in the drier which are directed toward the opposing wall by the fans. Such baffles, of which 60 is an exemplar, are preferably positioned within the space between the inner side wall surface of the drier and the conveyor. By varying the angulation of these baffles 60, greater or larger quantities of air moving along the side walls may be caused to by-pass the fans. These baffles are preferably located on the feed side of each fan (on that side of the fan in closest proximity to the discharge end of the drier). It will thus be seen that by varying the angle of these deflecting the baffles and by varying the spacing between the baffles and side wall of the drier, greater or smaller quantities of the total air passing longitudinally of the drier may be picked up by the fan and blown transversely of the drier. In this manner the drier actually employs a single stream of air which, in general, moves from the discharge end to the feed end of the drier. However, by reason of the side wall fans and regulatory baffles the air stream is caused to zig-zag in its passage toward the feed end, thereby most effectively imparting heat to the objects on the conveyor, causing drying to take place both from the interior and exterior surfaces of such objects and rapidly and uniformly reducing the moisture content of the objects without development of strains and the like.

Adjacent the discharge end of the drier, the roof may slope downwardly, as best indicated at 71. A heat source in the form of a gas-fired furnace 72 is positioned on the inclined portion of the roof, the hot gases generated thereby being directed longitudinally into the drier. Since these hot gases would normally travel through the upper portion of the dried toward the roof along the ventilating stacks 40 and during such passage raise the temperatures unduly, a part of this heat is picked up by a duct 73 extending longitudinally above the roof 3, this duct being provided with a hot air intake adjacent the furnace 72 (such air intake being indicated at 74) and a discharge outlet 75 toward the central part of the drier. The duct may include a fan 76, adjustably positionable baffles 77 at the intake port 74 and a deflecting vane or shield 78 adjacent the outlet port 75. This by-pass duct 73 and its appurtenances constitute a refinement which materially facilitates the control of temperatures within the drier.

We claim:

1. In an apparatus for drying long lengths of freshly extruded clay pipe and conduit comprising: a longitudinally extending continuous-type dryer having side walls and a roof, said dryer having an open feed end and a discharge end; a continuous chain conveyor extending through said dryer, said conveyor being provided with a series of rotatable rolls extending transversely of the dryer, said rolls being in spaced relation; fixed track means beneath the upper lay of said conveyor, said track means being in contact with said rolls; means for driving the conveyor to move the rolls in a direction transverse to their axes from the feed end to the discharge end of the dryer and to simultaneously impart rotation thereto by rolling contact with the track; a plurality of means in each side wall of the dryer for supplying heated gases thereto, said heat-supplying means being spaced from each other in each side wall; a gas exhaust stack in communication with the dryer adjacent the feed end thereof; fan means for positively moving heated gases longitudinally of the dryer toward the stack; and a plurality of auxiliary fan means for repeatedly directing heated gases in alternately opposite directions transversely of the conveyor and through pipes supported on said conveyor while said heated gases are progressing from near the discharge end of the dryer toward the feed end thereof and counter to the movement of pipe in the dryer.

2. An apparatus of the character stated in claim 1 including adjustably positionable baffle means in virtually vertical planes and in cooperable relation with at least some of the auxiliary fan means for controlling the proportion of total gases within the dryer directed toward the opposing wall by said auxiliary fan means.

3. An apparatus of the character stated in claim 1 wherein the dryer includes a horizontally disposed floor, the upper lay of the continuous conveyor extending longitudinally of the dryer above said floor and lower lays beneath said floor, the heat-supplying means being in cooperative relation with ports in side walls of the dryer above said floor, whereby heated gases are directed into the open ends of the pipe and conduit rotatably supported by the rotating rollers of said conveyor.

4. In an apparatus for drying long lengths of freshly extruded clay pipe and conduit comprising: a longitudinally extending continuous type dryer having side walls and a roof, said dryer having an open feed end and a discharge end; a continuous chain conveyor extending through said dryer, said conveyor being provided with a series of rotatable rolls extending transversely of the dryer, said rolls being in spaced relation; fixed track means beneath the upper lay of said conveyor, said track means being in contact with said rolls; means for driving the conveyor to move the rolls in a direction transverse to their axes from the feed end to the discharge end of the dryer and to simultaneously impart rotation thereto by rolling contact with the track; a plurality of means in each side wall of the dryer for supplying heated gases thereto, said heat-supplying means being spaced from each other in each side wall; a gas exhaust stack in communication with the dryer adjacent the feed end thereof and means for repeatedly directing heated gases in alternately opposite directions transversely of the conveyor and through pipes supported on said conveyor while said heated gases are progressing from near the discharge end of the dryer toward the feed end thereof and counter to the movement of pipe in the dryer, a portion of the roof of the dryer adjacent the discharge end being inclined downwardly toward the discharge end and means for supplying heated air through said inclined section of the roof longitudinally through the dryer and toward the exhaust stack.

5. In an apparatus for drying long lengths of freshly extruded clay pipe and conduit comprising: a longitudinally extending continuous type dryer having side walls and a roof, said dryer having an open feed end and a discharge end; a continuous chain conveyor extending through said dryer, said conveyor being provided with a series of rotatable rolls extending transversely of the dryer, said rolls being in spaced relation; fixed track means beneath the upper lay of said conveyor, said track means being in contact with said rolls; means for driving the conveyor to move the rolls in a direction transverse to their axes from the feed end to the discharge end of the dryer and to simultaneously impart rotation thereto by rolling contact with the track; a plurality of means in each side wall of the dryer for supplying heated gases thereto, said heat-supplying means being spaced from each other in each side wall; a gas exhaust stack in communication with the dryer adjacent the feed end thereof and means for repeatedly directing heated gases in alternately opposite directions transversely of the conveyor and through pipes supported on said conveyor while said heated gases are progressing from near the discharge end of the dryer toward the feed end thereof and counter to the movement of pipe in the dryer; a pair of longitudinally spaced ports in the roof of said dryer and a by-pass duct connecting the same; fan means in said duct for facilitating movement of gases therethrough; means in cooperative relation with the port farthest removed from the discharge end for directing gases from said duct toward the feed end of the dryer and adjustably positionable damping means in said duct in cooperative relation to that port in closest proximity to the discharge end of the dryer.

6. In an apparatus for drying long lengths of freshly extruded clay pipe and conduit, the combination of: a longitudinally extending continuous type dryer having side walls and a roof, said dryer having an open feed end and a discharge end; a continuous chain conveyor extending through said dryer, said conveyor being provided with a series of freely rotatable rolls extending transversely of the dryer; a fixed track beneath the upper lay of said conveyor in contact with said rolls; means for driving the conveyor to roll the rolls by contact with the track and simultaneously move the rolls from the feed end to the discharge end of the dryer; a gas exhaust stack in communication with the dryer adjacent the feed end thereof; a portion of the roof of the dryer adjacent the discharge end being inclined downwardly toward the discharge end and means for supplying heated air through said inclined section of the roof longitudinally through the dryer and toward the exhaust stack; a plurality of auxiliary fans and heat sources in the side walls of the dryer, said auxiliary fans and heat sources in one side wall being longitudinally displaced with respect to said auxiliary fans and heat sources in the opposite side wall, for directing heated gases in alternately opposite directions transversely of the conveyor while said heated gases are progressing from near the discharge end of the dryer toward the feed end thereof.

JOSEPH A. SIMPSON.
CLARK SUTHERLAND.

REFERENCES CITED

The following references are of record in the file of this patent:

UNITED STATES PATENTS

| Number | Name | Date |
|---|---|---|
| 811,446 | Schwartz | Jan. 30, 1906 |
| 1,697,454 | Brown et al. | Jan. 1, 1929 |
| 2,220,097 | Greer | Nov. 5, 1940 |
| 2,383,474 | Denner | Aug. 28, 1945 |
| 2,481,130 | Lindemuth | Sept. 6, 1949 |